United States Patent
Chou et al.

(10) Patent No.: US 7,405,766 B1
(45) Date of Patent: Jul. 29, 2008

(54) METHOD AND APPARATUS FOR PER-PIXEL MOTION ADAPTIVE DE-INTERLACING OF INTERLACED VIDEO FIELDS

(75) Inventors: Chih-Hsien Chou, San Jose, CA (US);
Chang-Hau Lee, Fremont, CA (US)

(73) Assignee: Kolorific, Inc., Milpitas, CA (US)

( * ) Notice: Subject to any disclaimer, the term of this patent is extended or adjusted under 35 U.S.C. 154(b) by 848 days.

(21) Appl. No.: 11/019,017

(22) Filed: Dec. 20, 2004

(51) Int. Cl.
*H04N 7/01* (2006.01)

(52) U.S. Cl. .................. 348/448; 348/452; 348/451; 348/459; 348/699; 348/700

(58) Field of Classification Search .................. 348/448, 348/452, 451, 459, 445, 441, 620, 700, 699, 348/911, 910, 431.1, 413.1, 416.1; 382/236; 375/240.16, 240.01
See application file for complete search history.

(56) References Cited

U.S. PATENT DOCUMENTS

| | | | | |
|---|---|---|---|---|
| 5,521,644 | A * | 5/1996 | Sezan et al. ................ | 348/452 |
| 5,689,301 | A | 11/1997 | Christopher et al. | |
| 5,793,435 | A * | 8/1998 | Ward et al. ................. | 348/448 |
| 5,852,473 | A | 12/1998 | Horne et al. | |
| 5,929,902 | A | 7/1999 | Kwok | |
| 6,421,090 | B1 * | 7/2002 | Jiang et al. ................. | 348/452 |
| 6,459,454 | B1 * | 10/2002 | Walters ..................... | 348/448 |
| 6,459,455 | B1 * | 10/2002 | Jiang et al. ................. | 348/452 |
| 6,580,463 | B2 | 6/2003 | Swartz | |
| 6,661,464 | B1 * | 12/2003 | Kokkosoulis et al. ........ | 348/448 |
| 6,704,055 | B1 | 3/2004 | He et al. | |
| 6,940,557 | B2 * | 9/2005 | Handjojo et al. ............ | 348/452 |
| 6,992,725 | B2 * | 1/2006 | Mohsenian ................. | 348/448 |
| 7,265,791 | B2 * | 9/2007 | Song et al. .................. | 348/448 |
| 7,286,186 | B2 * | 10/2007 | Lee ............................ | 348/452 |
| 7,319,491 | B2 * | 1/2008 | Matsuzaki et al. .......... | 348/452 |
| 7,349,026 | B2 * | 3/2008 | Wyman et al. .............. | 348/441 |
| 2002/0027610 | A1 * | 3/2002 | Jiang et al. ................. | 348/448 |

* cited by examiner

*Primary Examiner*—David Ometz
*Assistant Examiner*—Jean W Désir
(74) *Attorney, Agent, or Firm*—Pinnacle Patent Law Group

(57) ABSTRACT

A method for determining a value for a missing target pixel in an interlaced video field during a de-interlacing process includes providing at least one lookup table that correlates motion data to at least one of a plurality of de-interlacing methods, generating motion data related to the missing target pixel, utilizing the related motion data to perform a lookup on the at least one lookup table, and selecting the at least one de-interlacing method correlated to the motion data to generate the value for the missing target pixel. A de-interlacing system includes a motion detection unit that generates motion data related to a missing target pixel in a subject interlaced video field based on per-pixel motion measurements calculated from neighboring pixels in the subject field, at least one preceding field and at least one subsequent field, a video processing unit selects and utilizes at least one de-interlacing method to determine a value for the missing target pixel based on the related motion data, and at least one lookup table accessible to the video processing unit that correlates motion data to at least one of the plurality of de-interlacing methods.

23 Claims, 13 Drawing Sheets

F(n-1) Odd    F(n) Even    F(n+1) Odd

METHOD AND APPARATUS FOR PER-PIXEL MOTION ADAPTIVE DE-INTERLACING OF INTERLACED VIDEO FIELDS

BACKGROUND

The present invention relates to digital image processing and more particularly to a method and apparatus for converting interlaced video fields into progressively scanned frames.

World wide video standards such as NTSC, PAL, and SECAM use interlaced video formats to maximize the vertical refresh rates while minimizing the required transmission bandwidth. In an interlaced video format, a picture frame is divided into fields, as shown in FIGS. 1A and 1B, which depicts a picture frame 11 divided into three (3) exemplary video fields 10a, 10b, 10c. In each video field, e.g., 10a, a plurality of pixels 14 are arranged in scan lines 12a. The pixels 14 in one half of scan lines 12a of a picture frame are displayed on the screen during the first vertical scan period (i.e., the odd field 10a), while the pixels 14 in the other half of scan lines 12b, positioned halfway between those displayed during the first period, are displayed during the second vertical scan period (i.e., the even field 10b). While using an interlaced format provides the benefits mentioned above, it also can produce undesirable visual artifacts, such as line flicker and line crawling.

The visual artifacts can be minimized and the appearance of an interlaced image can be improved by converting it to a non-interlaced (progressive) format and displaying it as such. In fact, many newer display technologies, such as for example Liquid Crystal Displays (LCDs) and Plasma Display Panels (PDP), are designed to display progressively scanned video images, i.e., non-interlaced.

A conventional progressive video signal display system, e.g., a television (TV) or a projector, is illustrated in FIG. 1C. As is shown the display system 20 includes a signal receiving unit 22 that is coupled to a tuner box 24, and a video decoder 28. Signals, such as television signals, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29. As stated above, if the interlaced video signal 29 is displayed, undesirable visual artifacts, such as line flicker and line crawling, exist. Accordingly, a de-interlacer 30 is used to convert, i.e., de-interlace, the interlaced video signal 29 to generate a progressive video output signal 32. The progressive video output signal 32 is then displayed via an LCD or PDP 34.

Numerous methods have been proposed for de-interlacing an interlaced video signal to generate a progressive video signal. For instance, some methods perform a simple spatial-temporal de-interlacing technique, such as line repetition and field insertion. These methods, however, do not necessarily take into consideration motion between or within fields. For instance, it is well known that while line repetition is adequate for image regions having motion, line repetition is not suitable for stationary (still) image regions. By the same token, field insertion is a satisfactory de-interlacing method for stationary image regions, but inadequate for moving image regions. Therefore, utilizing one method presents a tradeoff between vertical spatial resolution and motion artifacts To address this issue, some de-interlacing methods are motion adaptive, i.e., they take into consideration the motion from field to field and/or from pixel to pixel in a field. Motion adaptive de-interlacing methods can dynamically switch or fade between different de-interlacing methods, such as between line repetition and field insertion. Per-field motion adaptive de-interlacing methods select a de-interlacing technique on a field-by-field basis. Thus, per-field de-interlacing methods do not maintain the overall quality throughout an image when there are both stationary and moving regions on it. Whereas, per-pixel de-interlacing methods select a de-interlacing technique on a pixel-by-pixel basis, thus providing a much better overall quality throughout an image.

Yet more de-interlacing methods are based on identifying the type of the source material from which the interlaced video signal was generated. For example, motion picture film or computer graphics signals are inherently progressive, i.e., non-interlaced. When the signals are transmitted for broadcasting, the signals are converted into interlaced video signals according to standards such as NTSC and PAL. Well known techniques such as 3:2 pull-down or 2:2 pull-down are used to break the original progressive frames into interlaced video fields while maintaining the correct frame rate. De-interlacing such signals originating from such non-interlaced (progressive) sources can be achieved with high quality if the original progressive frame sequences can be identified and reconstructed correctly. Thus, by recognizing that a video sequence originates from a progressive source, the original progressive frames can be reconstructed exactly from the appropriate video fields.

Unfortunately, video transmission formats do not include explicit information about the type of source material being carried, such as whether the material was derived from a progressive source. Thus, in order for a video processing device to exploit the progressive nature of film or CG sources, it is first necessary to determine whether the material originates from a progressive source. If it is determined that the material originates from such a source, it is furthermore necessary to determine precisely which video fields originate from which source frames.

Typically, the source of the interlaced video signal can be determined by examining the motion between successive fields of an input video sequence. It is well known that a 3:2 pull-down conversion produces a characteristic motion pattern or cadence. Accordingly, when such a pattern or cadence is detected, the de-interlacer can enter a "film mode". Nevertheless, if there are improperly edited video sequences ("bad edits") that disrupt the 3:2 pull-down cadence, the de-interlacer will terminate the "film mode," and implement other de-interlacing techniques until it detects the characteristic pattern or cadence. During the "non film mode" period, non-optimal de-interlacing methods are generally used that result in degraded video quality, e.g., feathering and loss of vertical resolution, for the progressive video output. Moreover, if the interlaced input video signal is derived from a conversion process other than a 3:2 pull down or if the source signal is more complex than a pure progressive frame, e.g., a film/video overlap, cross-fade, or split screen, the cadence based detection method cannot reliably detect the 3:2 pull-down cadence and the quality of the resultant progressive video output will suffer.

Accordingly there exists a need for an improved process and apparatus for converting an interlaced video signal into a progressively scanned video signal. The method and apparatus should be able to minimize visual artifacts resulting from motion and should be relatively easy to implement.

SUMMARY

A method for determining a value for a missing target pixel in an interlaced video field during a de-interlacing process includes providing at least one lookup table that correlates motion data to at least one of a plurality of de-interlacing methods, generating motion data related to the missing target pixel, utilizing the related motion data to perform a lookup on the at least one lookup table, and selecting the at least one de-interlacing method correlated to the motion data to generate the value for the missing target pixel.

In another version, a method for converting a subject interlaced video field into a progressive video frame is provided. The interlaced video field comprises a plurality of available pixels and a plurality of missing pixels. The method includes calculating motion data related to each of the missing pixels in the subject field, where the motion data represents motion between at least two available pixels and between at least two interlaced fields, and determining whether to merge the subject field with either a previous field, a subsequent field or a combination of the previous and subsequent fields based on the motion data between the at least two fields. If it is determined not to merge the fields, the method includes considering a first missing pixel in the subject field and selecting at least one of a plurality of per-pixel interpolation methods based on the motion data related to the missing pixel via at least one lookup table. The lookup table correlates motion data to at least one per-pixel interpolation method during a training process. The selected at least one per-pixel interpolation method is then utilized to generate a value for the missing pixel.

In another version, a method for selecting a per-pixel interpolation process that is used to determine a value for a missing target pixel in a subject interlaced video field includes providing at least one lookup table that correlates motion data to at least one of a plurality of per-pixel interpolation processes. Motion data related to the missing target pixel is calculated by analyzing pixel data associated with a plurality of pixels proximate to the missing target pixel, calculating per-pixel motion measurements between the plurality of pixels, and utilizing the per-pixel motion measurements to calculate per-pixel motion data and per-field motion data. The per-pixel motion data and a first portion of the per-field motion data are used to perform a lookup on the at least one lookup table. The first portion of the per-field motion data indicates the presence of higher levels of per-field motion measurements. The per-pixel interpolation method(s) correlated to the per-pixel motion data and the first portion of the per-field motion data is selected.

In another version, a de-interlacing system includes a motion detection unit that generates motion data related to a missing target pixel in a subject interlaced video field based on per-pixel motion measurements calculated from neighboring pixels in the subject field, at least one preceding field and at least one subsequent field, a video processing unit selects and utilizes at least one de-interlacing method to determine a value for the missing target pixel based on the related motion data, and at least one lookup table accessible to the video processing unit that correlates motion data to at least one of the plurality of de-interlacing methods.

In another version, a progressive scan display system includes a signal receiving unit, a tuner box for transforming the signal into an analog signal, and a video decoder for transforming the analog signal into a plurality of interlaced video fields. The interlaced video fields are converted into a progressive video signal by a de-interlacing system that includes a motion detection unit for generating motion data related to a missing target pixel in a subject interlaced video field based on per-pixel motion measurements calculated from temporally and spatially proximate pixels in the subject field, in at least one preceding field and in at least one subsequent field, a video processing unit for receiving the motion data, and for selecting and utilizing at least one of a plurality of de-interlacing methods to determine a value for the missing target pixel based on the motion data related to the missing target pixel, and at least one lookup table accessible to the video processing unit for correlating motion data to at least one of the plurality of de-interlacing methods, whereby the video processing unit selects the at least one de-interlacing method by utilizing the motion data related to the missing target pixel to perform a lookup on the at least one lookup table. The progressive video signal is then displayed on a display.

DRAWINGS

These features, aspects and advantages of the present invention will become better understood with regard to the following description, appended claims, and accompanying drawings, which illustrate examples of the invention. Nevertheless, it is to be understood that each of the features can be used in the invention in general, not merely in the context of the particular drawings, and the invention includes any combination of these features, where:

DESCRIPTION

The present invention relates to digital image processing and more particularly to a method and apparatus for converting an interlaced video field into a progressively scanned frame. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is to be accorded the widest scope consistent with the principles and features described herein.

Figure 2:
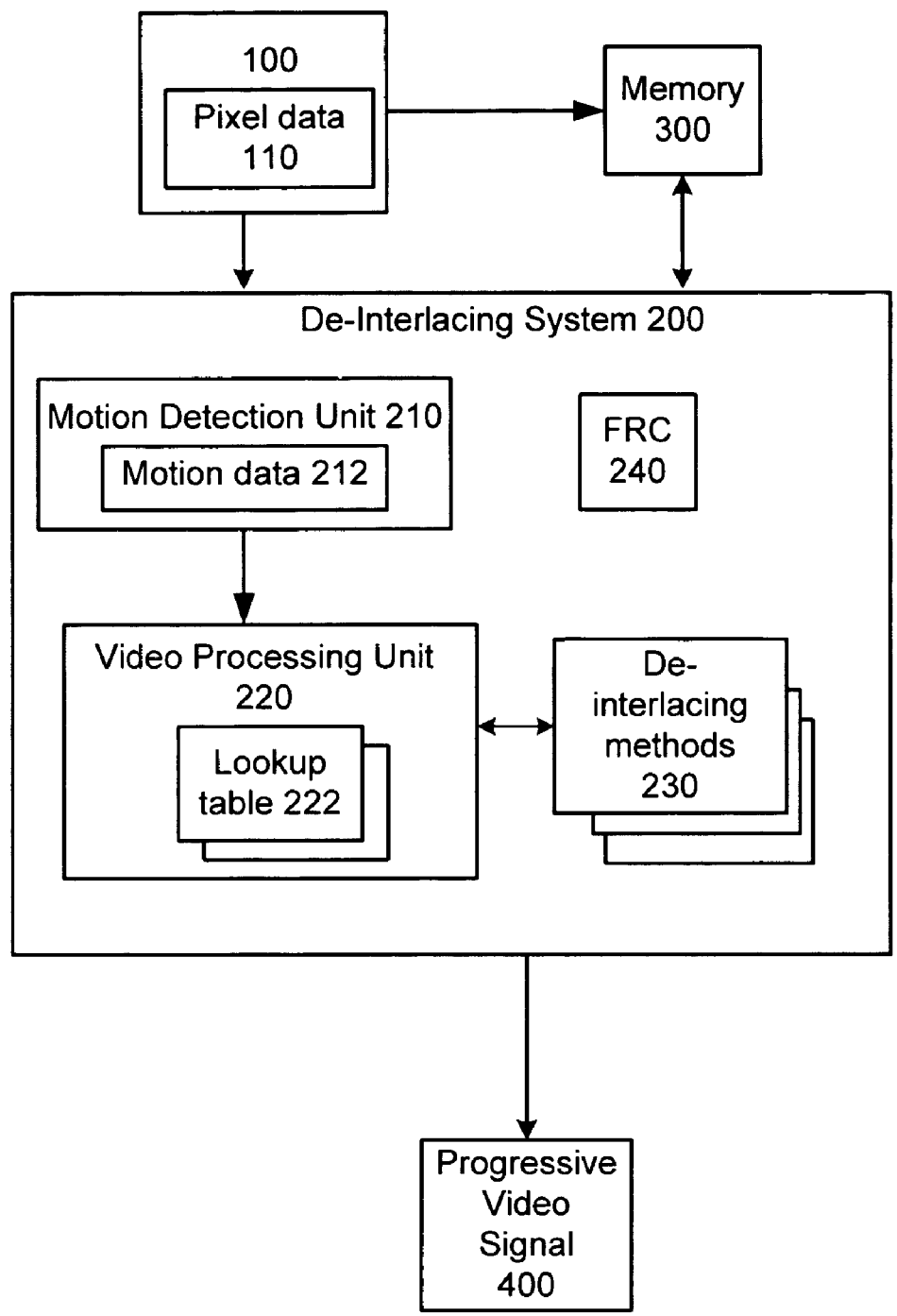
FIG. 2 is a schematic block diagram of a interlaced-to-progressive scan conversion (i.e., de-interlacing) system that can be utilized according to one version of the present invention.

FIG. 2 is a schematic block diagram of a interlaced-to-progressive scan conversion (i.e., de-interlacing) system that can be utilized according to one version of the present invention. The de-interlacing system 200 receives an input video signal 100 and outputs a progressive video signal 400. The system 200 is coupled to a memory module 300 that can be external or internal to the system 200. The memory module 300 is used to receive and store data that can be accessed by the de-interlacing system 200 during the de-interlacing process.

Figure 1A:
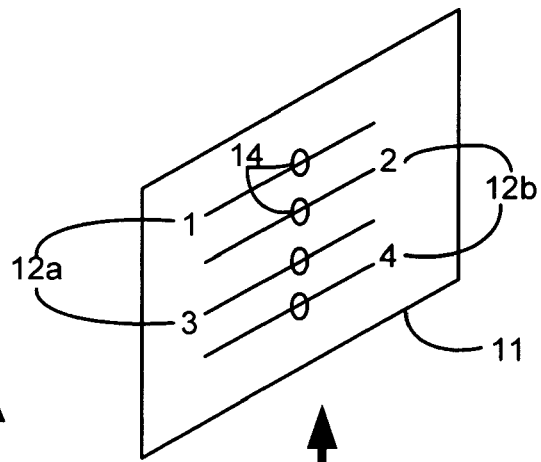
FIG. 1A depicts an exemplary picture frame.

The de-interlacing system 200 comprises a motion detection unit 210 and a video processing unit 220. The motion detection unit 210 processes the input signal 100 and calculates motion data 212 related to a missing target pixel 16 (FIG. 1), i.e., a missing pixel, in an interlaced field 10b for which a value must be determined in order to generate the corresponding progressively scanned video signal 400. The video processing unit 220 includes at least one look up table 222 that references a plurality of de-interlacing methods 230. The de-interlacing methods 230 can include those that are based on field merging and those that are based on per-pixel interpolation, or a combination thereof. Depending in part on the motion data 212 for the missing target pixel 16, the video processing unit 220 utilizes the lookup table(s) 222 to select at least one optimal de-interlacing method 230 to generate a value for the missing target pixel 16.

The video processing unit 220 also includes a frame rate converter (FRC) 240. The FRC 240 analyzes the frame rate of the input signal 100 to ensure that the frame rate of the progressive video output signal 400 is appropriate for a system, e.g., a display system, downstream from the de-interlacing system 200. The implementation and functionality of the FRC 240 is well known to those skilled in the art and will not be described further.

Figure 3:
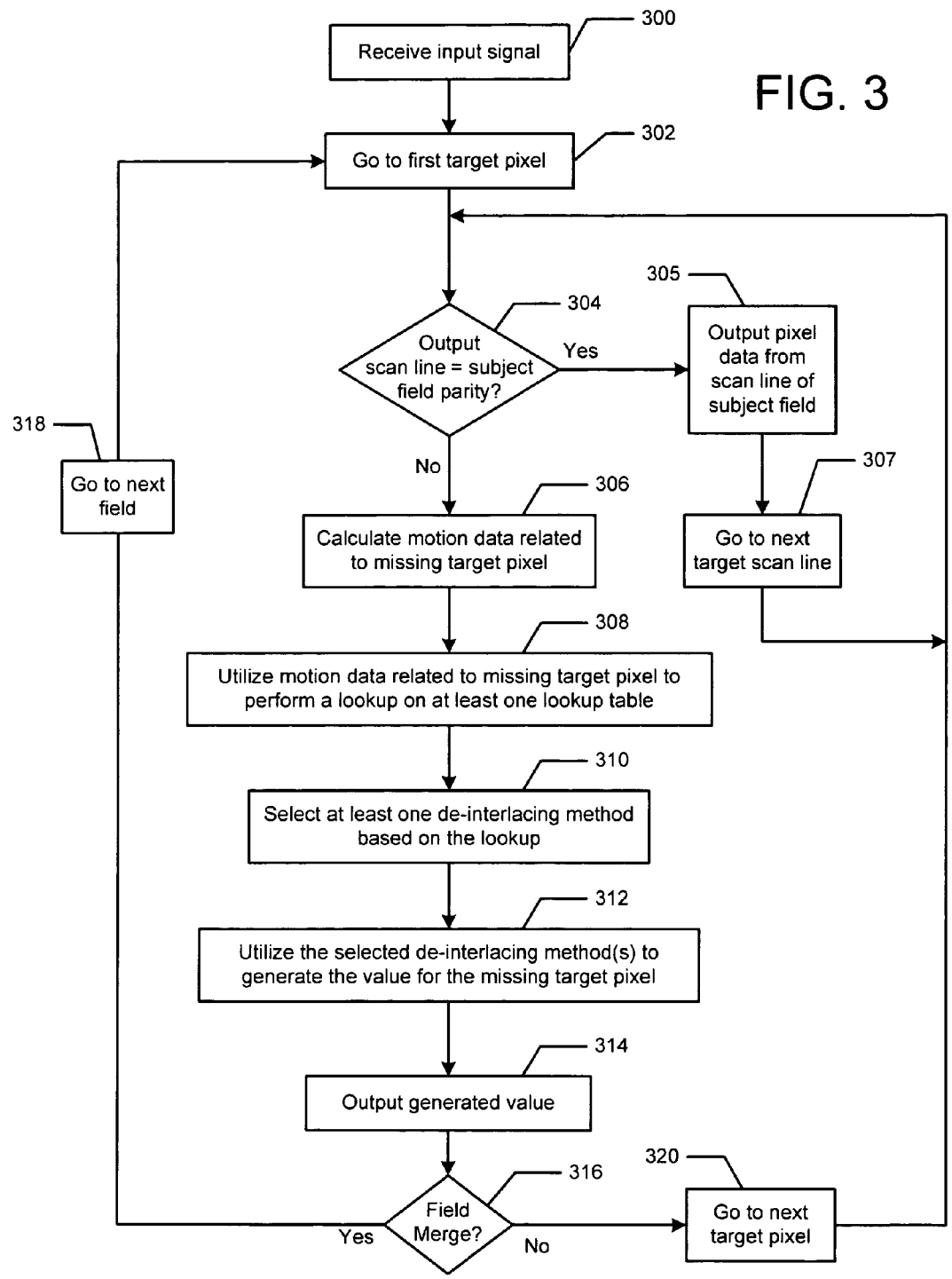
FIG. 3 is a flowchart illustrating a process for de-interlacing the input video signal from an interlaced subject field according to one version of the present invention.

FIG. 3 is a flowchart illustrating a process for de-interlacing the input video signal 100 from an interlaced subject field, e.g., 10b, according to one version of the present invention. Referring to FIGS. 2 and 3, the process begins when the de-interlacing system 200 receives the interlaced input video signal 100 (step 300). The interlaced input signal 100 includes pixel data 110 for each pixel 14 (FIG. 1) in a scan line 12a, 12b in fields preceding, e.g., 10a, the subject field 10b, and following, e.g., 10c, the subject field 10b, as well as in the subject field 10b itself. The pixel data 110 can be a monochrome video signal or the luminance components of a component color video signal for the corresponding pixel 14. The input signal 100 is also stored directly in the memory module 300 so that the de-interlacing system 200 can access the pixel data 110 during the de-interlacing process, e.g., by the FRC 240 or the video processing unit 220. Note that although not explicitly shown, the de-interlacing system 200 continuously receives and stores the interlaced input video signal 100 from video fields downstream from the subject field 10b.

The de-interlacing system 200 goes to a first target pixel in a first target scan line that is to be determined and outputted in an output scan line in the progressive video signal 400 corresponding to the subject field 10b (step 302). The de-interlacing system 200 determines whether the output scan line being generated is of the same parity as the interlaced subject field 10b (step 304). If such is the case, the interlacing system 200 outputs the pixel data 110 from the subject field 10b corresponding to the scan line being generated (step 305), then proceeds to the next target scan line (step 307), and repeats step 304. For example, if the parity of the subject field 10b is "even," i.e., the field 10b includes pixel data 110 for pixels 14 in even numbered scan lines 12b, and if the output scan line being generated is also an "even" numbered scan line, e.g., 2, the de-interlacing system 200 will output the pixel data 110 for the pixels 14 in scan line 2 (12b) in the subject field 10b.

Figure 1B:
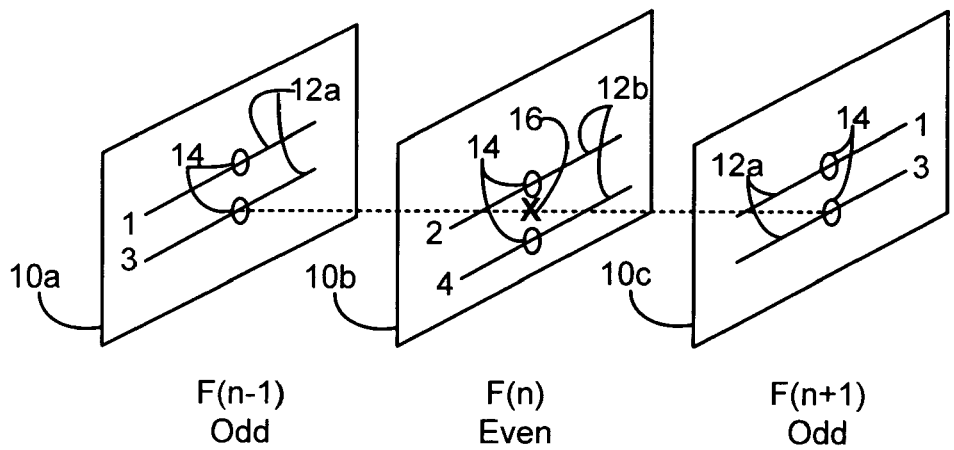
FIG. 1B depicts exemplary interlaced video fields.
Figure 1C:
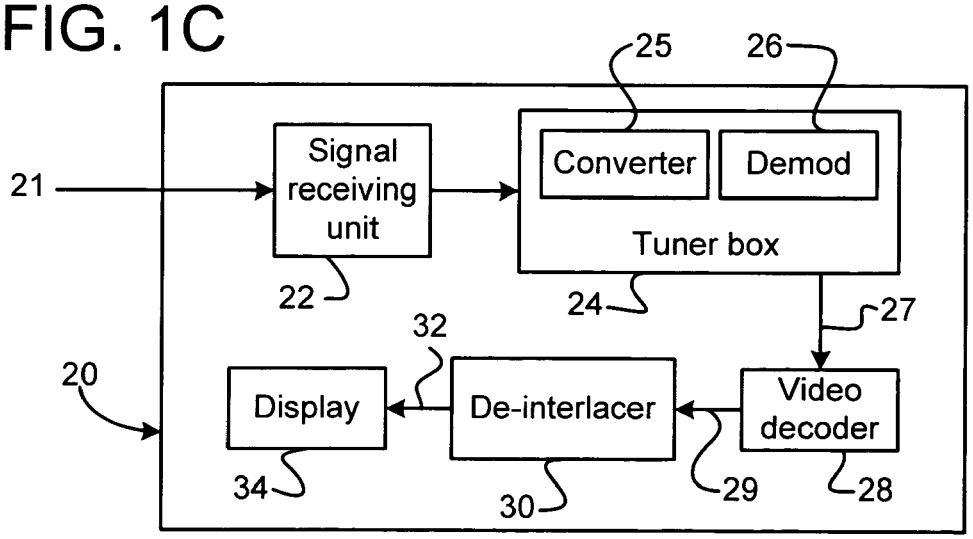
FIG. 1C illustrates a conventional progressive video signal display system.

If the parity of the output scan line, however, is not the same as the parity of the subject field 10b, then the target pixel is a missing target pixel 16, as depicted in FIG. 1B. In this situation, the de-interlacing system 200 will calculate a value for the missing target pixel 16 based on motion data 212 around the missing target pixel 16.

According to one version, the motion detection unit 210 calculates motion data 212 related to the missing target pixel 16 (step 306). The motion data 212 for the missing target pixel 16 indicates the level of motion present around the missing pixel 16 and preferably incorporates temporal, i.e. inter-field, as well as spatial, i.e., intra-field, motion aspects. The motion data 212 is received by the video processing unit 220, which utilizes the motion data 212 to perform a lookup on at least one lookup table 222 (step 308).

In one version, the lookup table 222 comprises a plurality of values that correspond to the motion data 212 and correlate the motion data 212 to at least one of the plurality of de-interlacing methods 230 or a combination of de-interlacing methods. The plurality of lookup table values are generated and stored in the lookup table 222 during a configuration/training process, which will be described later below.

The video processing unit 220 selects at least one de-interlacing method 230 based on the table lookup, e.g., the de-interlacing method(s) 230 correlated with the motion data 212 (step 310). Depending on the motion data 212, the selected de-interlacing method(s) can be a field merging method, where the video processing unit 220 merges the pixel data 110 from one of the adjacent fields, e.g., 10a or 10c, into the subject field 10b. The selected de-interlacing method can also be a per-pixel interpolation method, where the value of the missing target pixel 16 is calculated from the values of surrounding pixels 14 in the subject field 10b or different fields 10a, 10c. Accordingly, depending on the motion data 212 related to the missing target pixel 16, a different de-interlacing method 230 can be utilized for each missing target pixel 16.

Once the de-interlacing method 230 correlated to the motion data 212 is selected, the processing unit 220 utilizes the selected de-interlacing method 230 to generate the value for the missing target pixel 16 (step 312). This value is outputted as part of the progressive output signal 400 (314). If the de-interlacing method selected is a field merging method (step 316), the de-interlacing system 200 goes to the next interlaced video field (step 318) and repeats steps 302 to 318. If the de-interlacing method selected 230 is not a field merging method, i.e., it is a per-pixel interpolation method, the de-interlacing system 200 then proceeds to the next target pixel (step 320) and steps 304 through 316 are repeated until the subject field 10b has been de-interlaced.

Figure 4:
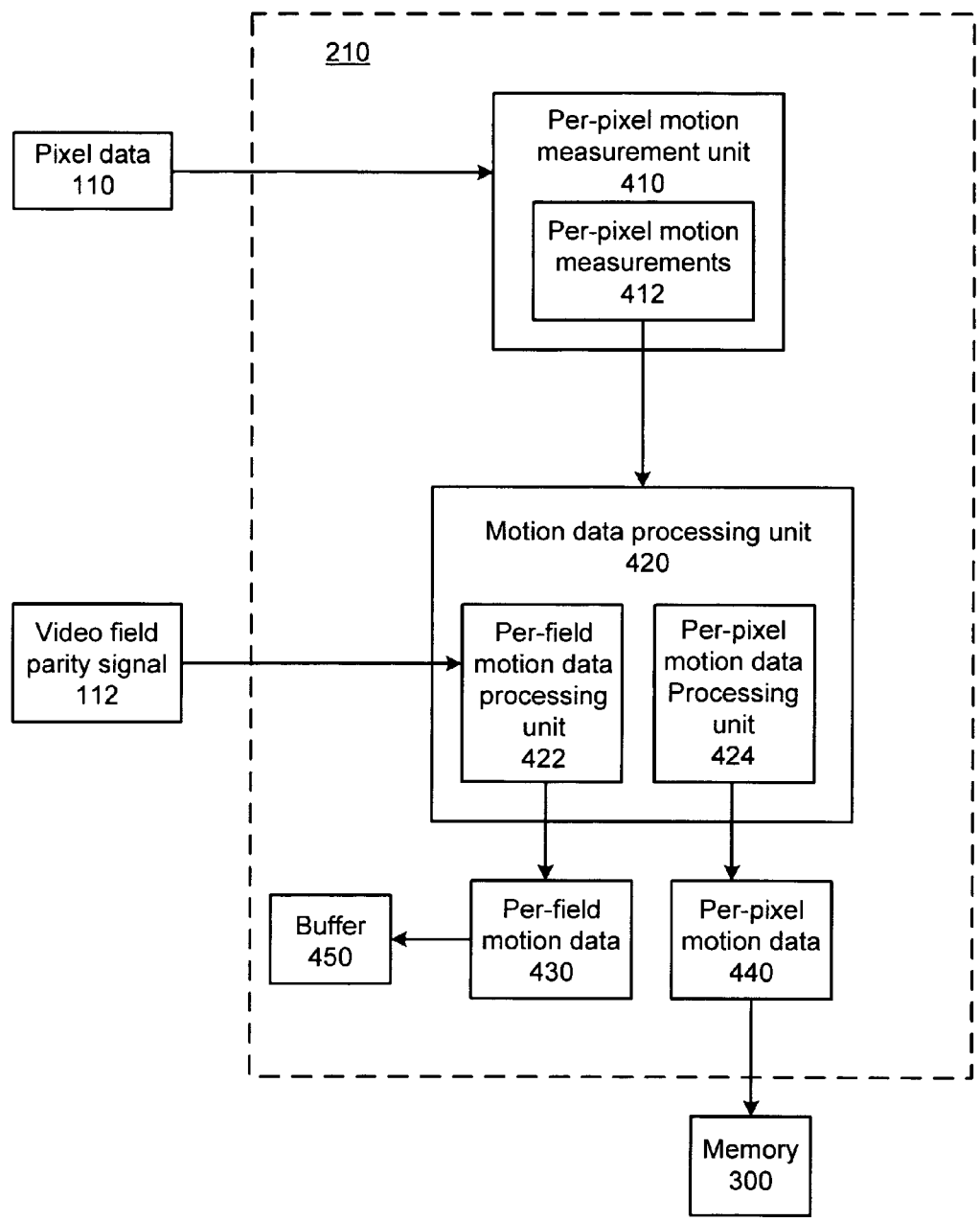
FIG. 4 is a schematic block diagram of one version of the motion detection unit.

A schematic block diagram of one version of the motion detection unit 210 is illustrated in FIG. 4. The motion detection unit 210 includes a per-pixel motion measurement unit 410 and a motion data processing unit (MDPU) 420. The per-pixel motion measurement unit 410 analyzes the pixel data 110 for pixels 14 in at least one field preceding (10a) and in at least one field following (10c) the subject field 10b, as well as in the subject field 10b itself. From this analysis, the per-pixel motion measurement unit 410 generates per-pixel motion measurements 412 for fields of the same and opposite parity.

Figure 5:
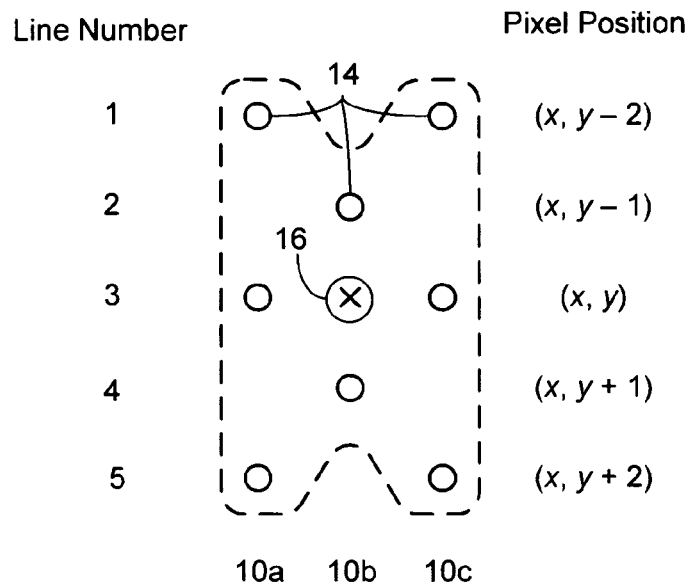
FIG. 5 illustrates a schematic representation of eight pixels used to calculate motion data according to one version.

In one version, same and opposite field per-pixel motion measurements 412 are calculated from eight (8) pixels 14 that form a butterfly-like configuration surrounding the missing target pixel 16. FIG. 5 illustrates a schematic representation of the eight pixels 14 according to this version. Three pixels 14 in each of the preceding 10a and subsequent 10c fields and two pixels 14 in the subject field 10b are used to calculate the same and opposite field motion measurements 412. All eight pixels 14 are vertically adjacent in their respective fields and they form a butterfly profile in the temporal-vertical plane.

Figure 6A:
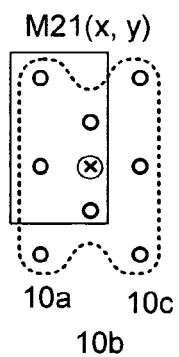
FIGS. 6A through 6E illustrate pixels that are utilized to calculated associated motion measurements.
Figure 6B:
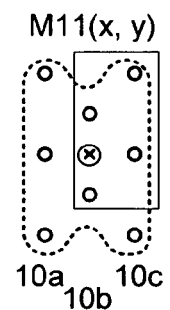
Figure 6E:
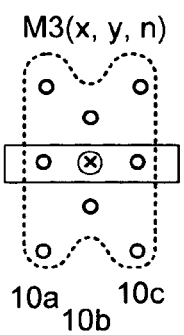
Figure 6C:
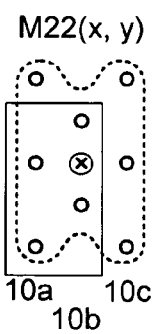
Figure 6D:
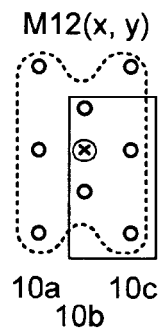

From the eight pixels 14, five (5) motion measurements are calculated. FIGS. 6A through 6E illustrate which pixels 14 are utilized to calculated the associated motion measurements. FIGS. 6A and 6C produce opposite-parity field motion measurements (e.g., M21 and M22) between fields 10a and 10b, while FIGS. 6B and 6D produce opposite-parity field motion measurements (M11, M12) between fields 10b and 10c. FIG. 6E produces same-parity field motion measurements (M3) between fields 10a and 10c.

Various methods and systems for measuring per-pixel motion in same and opposite fields can be utilized to generate the per-pixel motion measurements 412, and these are known to those skilled in the art. Nevertheless, it is preferable to utilize a method and apparatus described in a co-pending United States patent application, entitled "Method and System for Detecting Motion Between Video Field of Same and Opposite Parity From An Interlaced Video Source," U.S. application Ser. No. 11/001,826 filed on Dec. 2, 2004, and assigned to the assignee of the present invention, and is herein incorporated by reference in its entirety.

Referring again to FIG. 4, the MDPU 420 includes a per-field MDPU 422 and a per-pixel MDPU 424. The per-pixel motion measurements 412 are received and utilized by the per-field 422 and per-pixel 424 MDPUs to generate per-field motion data 430 and per-pixel motion data 440, respectively. In one version, the per-field MDPU 422 also receives and analyzes a video field parity signal 112, which is used to detect abnormalities in the interlaced input signal 100. This functionality will be described in greater detail below.

The per-field motion data 430 is temporarily stored in a buffer 450 so that it is available to the video processing unit 220 (FIG. 2) downstream. The per-pixel motion data 440, however, is stored in memory 300 along with the pixel data 110 (FIG. 2) due, in part, to its relatively large size.

Figure 7:
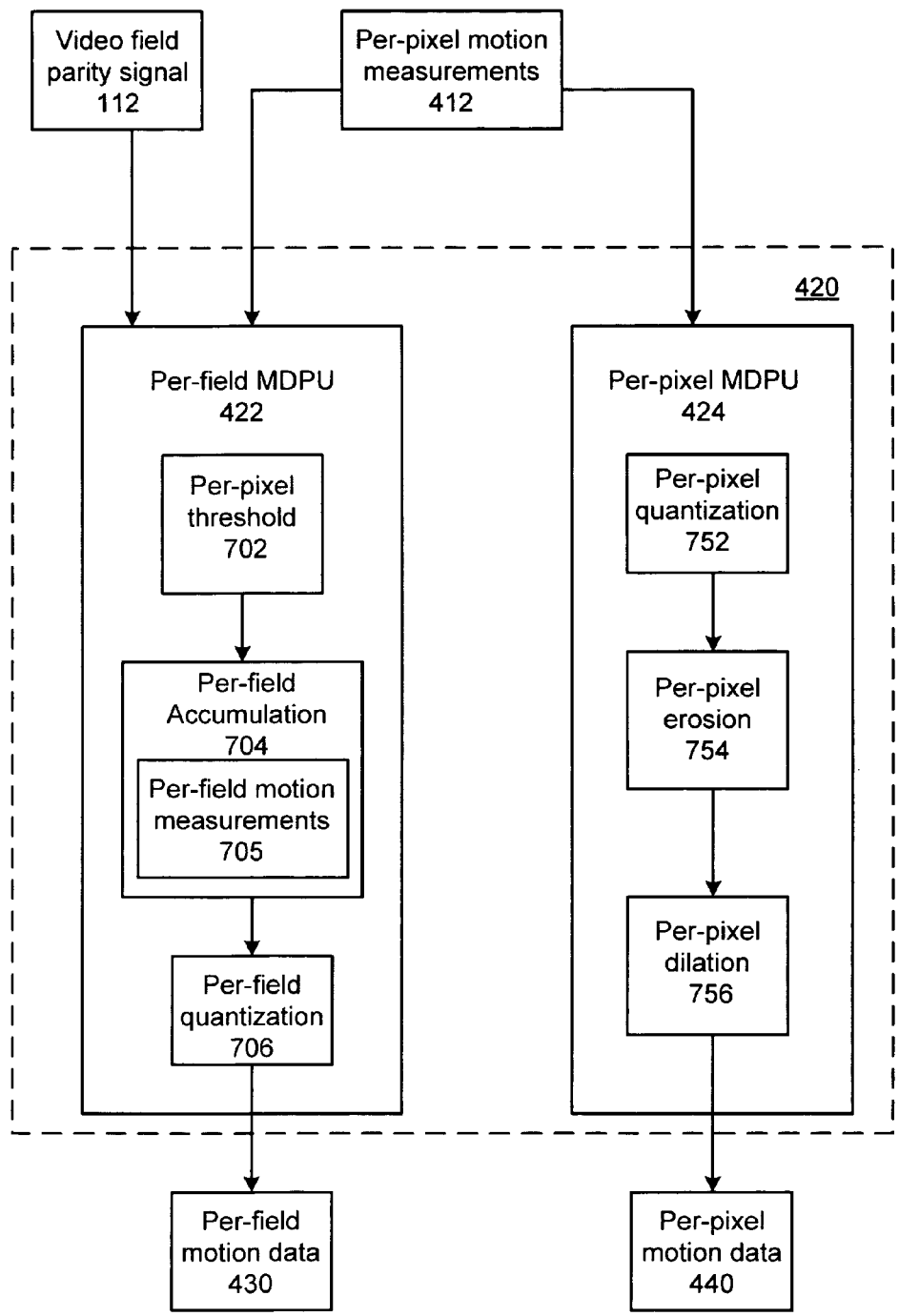
FIG. 7 illustrates a schematic block diagram of the motion data processing unit according to a version of the present invention.

FIG. 7 illustrates a schematic block diagram of the MDPU 420 according to a version of the present invention. The per-field MDPU 422 includes a per-pixel threshold unit 702, a per-field accumulation unit 704, and a per-field quantization unit 706. The per-pixel threshold unit 702 determines the extent to which the same and opposite field per-pixel motion measurements 412 exceed predetermined same and opposite field threshold values. Those per-pixel motion measurements 412 that exceed the predetermined threshold values are passed to the per-field accumulation unit 704, which accumulates them and generates per-field motion measurements 705, which represent the level of motion between two fields or between regions of two fields of opposite and same parity.

In one version, the per-pixel threshold unit 702 analyzes the video field parity signal 112, which indicates the parity value, i.e., even or odd, of the fields 10a, 10b, 10c under consideration. By analyzing the video field parity signal 112, the per-pixel threshold unit 702 can detect abnormal field sequences. For example, a normal field sequence comprises a string of alternating parity fields, i.e., odd-even-odd-even . . . , fields. An abnormal field sequence is one that violates the alternating parity sequence resulting, for example, from a bad edit or some other anomaly. If the per-pixel threshold unit 702 detects such an event from the video field parity signal 112, it will artificially increase the per-pixel motion measurements 412 corresponding to the out-of-sequence field pair, thereby elevating the corresponding per-field motion measurement 705.

The per-field quantization unit 706 quantizes the per-field motion measurements 705 to reduce the number of bits used to represent their values. The resultant output of the per-field quantization unit 706 is the per-field motion data 430 relating to the missing target pixel 16. In one version, the per-field motion data 430 comprises a plurality of bits, where each bit corresponds to the level of motion between two fields of opposite (10a, 10b), (10b, 10c) or same (10a, 10c) parity.

Figure 8A:
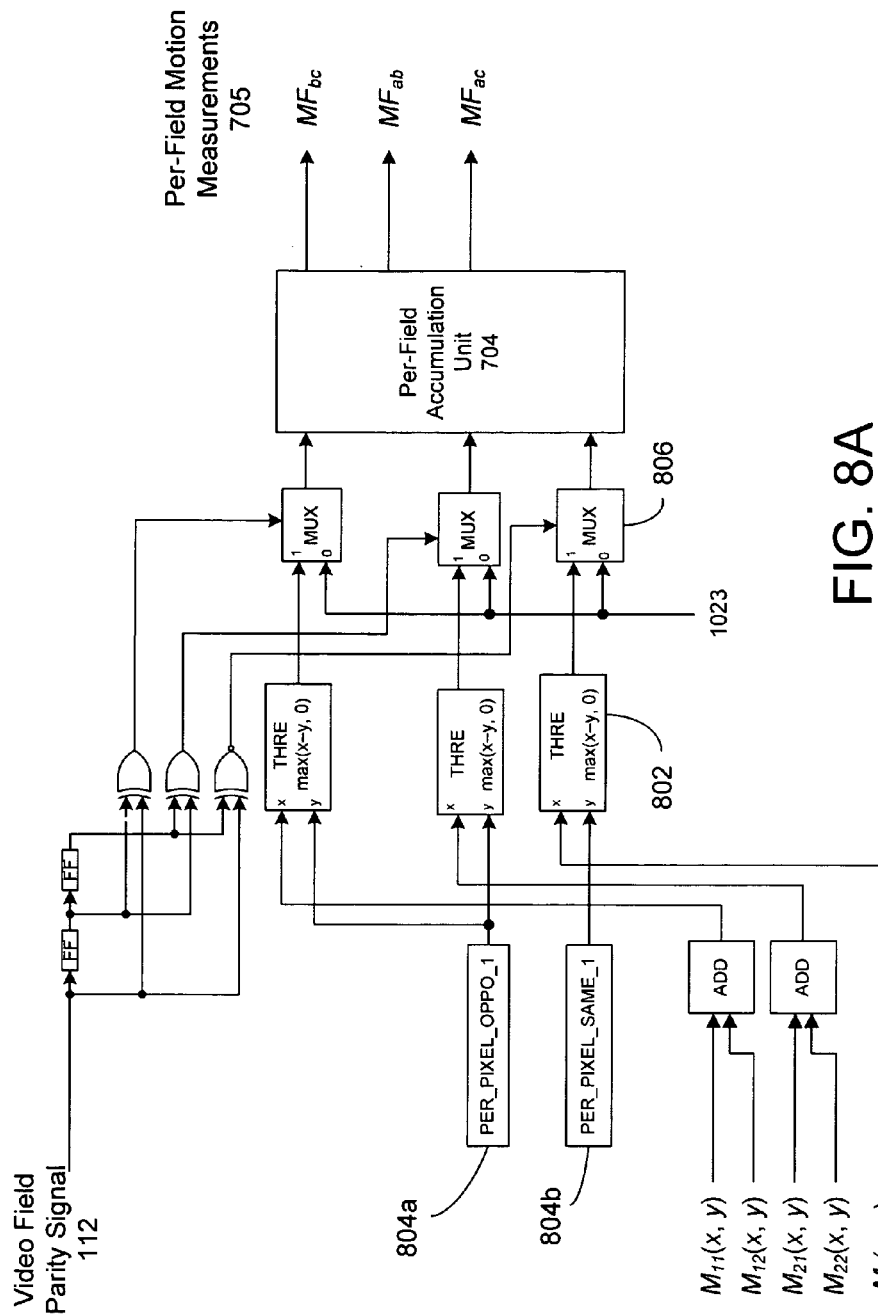
FIGS. 8A and 8B illustrate an exemplary logic diagram of the per-field motion data processing unit according to one version.
Figure 8B:
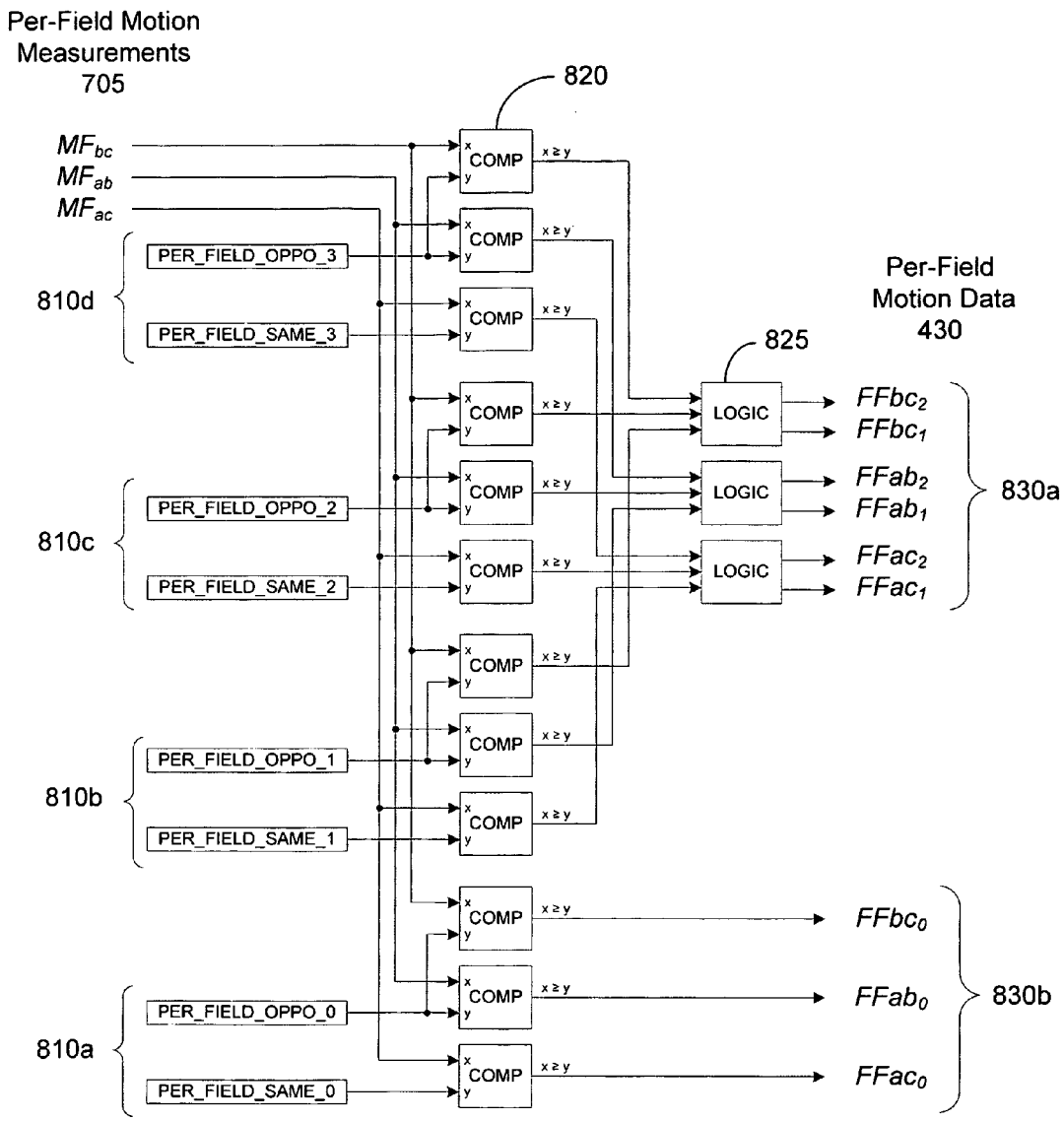

FIGS. 8A and 8B illustrate an exemplary logic diagram of the per-field MDPU 422 according to one version. FIG. 8A illustrates the per-pixel threshold function 702 and per-field accumulation function 704, and FIG. 8B illustrates the per-field quantization function 706. As is shown in FIG. 8A, opposite field per pixel motion measurements ($M_{11}$, $M_{12}$ and $M_{21}$, $M_{22}$) are added and the added value is inputted into threshold functions (e.g., "x" input) 802. It is determined whether the inputs ("x") are greater than a threshold value ("y" input) for opposite field per-pixel motion measures (PER_PIXEL_OPPO_1) 804a. If the input (x) is not greater than the threshold (y), then the output of the threshold function is zero (0). Otherwise, the threshold function output is the difference between the input (x) and the threshold value (y).

Similarly, the same field per pixel motion measurement ($M_3$) is inputted into another threshold function 802 where it is determined whether the inputted value (x) is greater than a threshold value ("y" input) for same field per-pixel motion measures (PER_PIXEL_SAME_1) 804b. If the inputted value (x) is not greater than the threshold value (y), then the output of the threshold function is zero (0). Otherwise, the threshold function output is the difference between the inputted value (x) and the threshold value (y).

Each threshold function output is inputted into a multiplexer (MUX) 806 that receives an address signal indicating whether an abnormal field sequence exists. If an abnormal field sequence is detected, the signal will be a zero (0), and the MUX 806 will pass a value corresponding to the signal. The value, e.g., 1023, is an artificially elevated motion measurement to indicate that the field sequence has been interrupted. If an abnormal field sequence is not detected, the signal will be a one (1), and the MUX 806 will pass the threshold function output. The MUX outputs are passed to the per-field accumulation unit 704 which accumulates the thresholded motion measurements and outputs per-field motion measurements 705 between opposite field pairs ($MF_{bc}$, $MF_{ab}$) and same field pairs ($MF_{ac}$).

In FIG. 8B, the per-field quantization unit 706 can comprise a plurality of per-field threshold pairs 810a-810d. Each pair, e.g., 810a, includes an opposite field (PER_FIELD_OPPO_0) and same field (PER_FIELD_SAME_0) threshold value. A comparator 820 compares each per-field motion measurement 705 to one of the threshold values in each of the pairs 810a-810d based on the whether the per-field motion measurement being compared is between opposite fields or same fields. For instance, per-field motion measurements for opposite field pairs ($MF_{bc}$, $MF_{ab}$) are compared to the opposite field threshold values and per-field motion measurements for same field pairs ($MF_{ac}$) are compared to the same field threshold values.

In a preferred embodiment, the threshold values for pair 810a are less than those for pair 810b, which are less than those for pair 810c, which are less than those for pair 810d. Hence, the per-field threshold pairs 810a-810d represent a step function of increasing per-field motion measurement values. For each step or range of values, one or more particular de-interlacing methods may be most effective for generating the value for the missing pixel 16. For example, the greater the per-field motion measurement value 705, the more likely a per-pixel interpolation method will be needed to generate the value of the missing pixel 16. Whereas, the lower the per-field motion measurement value 705, the more likely a field merging method can be utilized.

The per-field motion data 430 comprises the results of the threshold comparison by the comparators 820. In this version, the per-field motion data 430 is a string of nine bits. The bit results for the higher threshold pairs 810b-810d are passed to a select logic block 825 and the corresponding per-field motion data 830a is used to determine which, if any, per-pixel interpolation method(s) is optimal to generate the value of the missing pixel 16. Similarly, the bit results for the lowest threshold pair 810a comparisons are the per-field motion data 830b that is used to determine which, if any, field-merging method is optimal. The per-field motion data 430 fluctuates on a per-field basis.

Referring again to FIG. 7, the per-pixel MDPU 424 includes a per-pixel quantization unit 752, a per-pixel erosion unit 754 and a per-pixel dilation unit 756. The per-pixel quantization unit 752 quantizes the per-pixel motion measurements 412 to reduce the number of bits used to represent their values. The pixel erosion unit 754 and per-pixel dilation unit 756 are utilized to reduce false motion detections and to improve motion/non-motion border regions, respectively, in order to improve the reliability of the per-pixel motion data 440.

Figure 9:
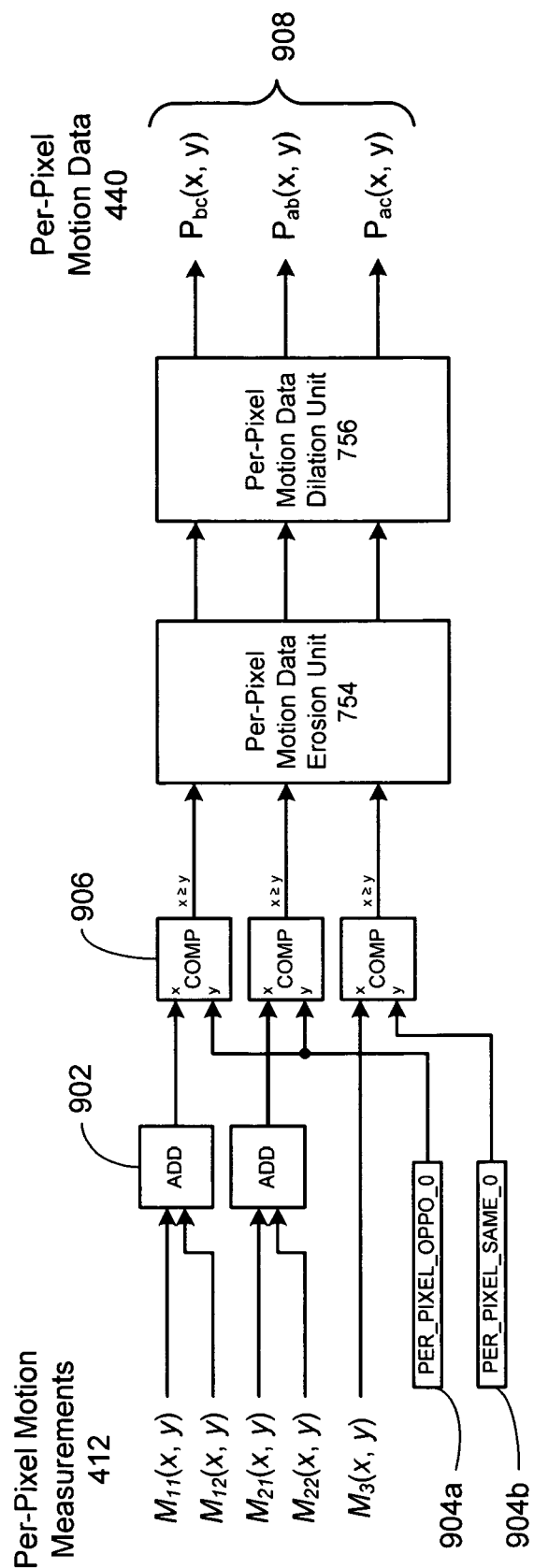
FIG. 9 illustrates an exemplary logic diagram of the per-pixel motion data processing unit according to one version.

FIG. 9 illustrates an exemplary logic diagram of the per-pixel MDPU 424 according to one version. An adder 902 adds opposite field per pixel motion measurements ($M_{11}$, $M_{12}$ and $M_{21}$, $M_{22}$) and the results are inputted into comparators 906 (e.g., "x" input). It is determined whether the inputs ("x") are greater than or equal to a per-pixel opposite field threshold value (PER_PIXEL_OPPO_0) 904a. If the input (x) is less than the threshold value 904a, then the output of the comparator 906 is binary zero (0). Otherwise, the output is binary one (1). Similarly, the same field per pixel motion measurement ($M_3$) is compared to a per-pixel same field threshold value (PER_PIXEL_SAME_0) 904b. The outputs pass through the erosion unit 754 and the dilation unit 756 and the resultant output is per-pixel motion data 440 between opposite ($P_{bc}$, $P_{ab}$) and same ($P_{ac}$) fields.

Like the per-field motion data 430, the per-pixel motion data 440 comprises a plurality of bits 908 that will be used to determine which, if any, per-pixel interpolation method is optimal to generate the value for the missing target pixel 16. Unlike the per-field motion data 430, however, the per-pixel motion data 440 fluctuates on a per-pixel basis.

Referring again to FIG. 2, the video processing unit 220 utilizes the per-field motion data 430 and per-pixel motion data 440 (collectively referred to as the motion data 212) related to the missing target pixel 16 to determine the optimal de-interlacing method(s) to generate a value for the missing target pixel 16. In one version, the motion data 212, which comprises the string of bits representing the per-pixel 440 and per-field 430 motion data, is used to perform a lookup on at least one of the lookup tables 222. As stated above, the lookup tables 222 correlate the motion data 212 to at least one or a combination of de-interlacing methods 230. In one embodiment, values in the lookup tables 222 are determined during a configuration or training process.

Figure 10:
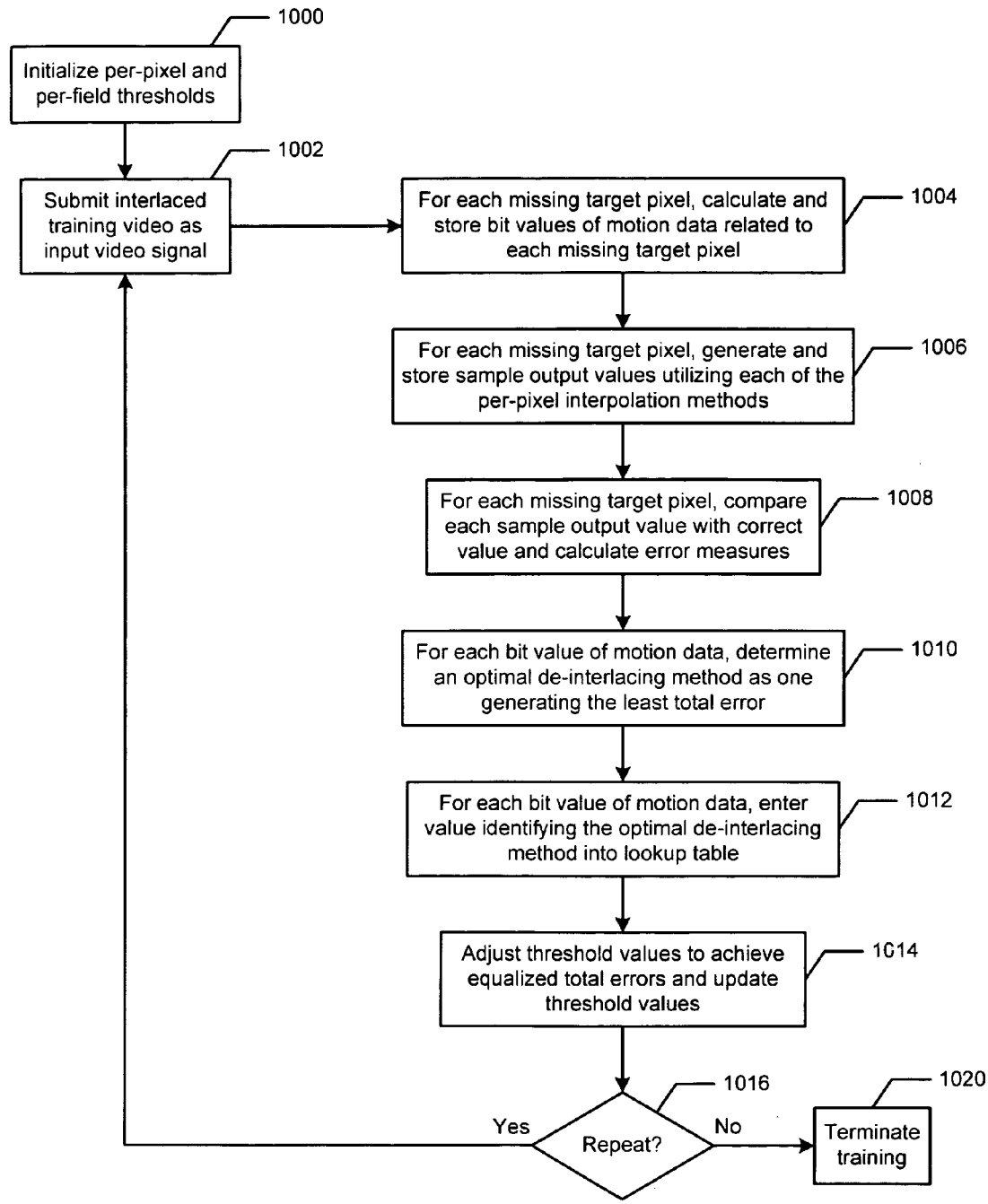
FIG. 10 is a flowchart illustrating a training process according to one version of the present invention.

FIG. 10 is a flowchart illustrating a training process according to one version of the present invention. Referring to FIGS. 2 and 10, the training process begins by initializing the per-pixel (804a, 804b, 904a, 904b) and per-field threshold values (810a-810d) (step 1000). Initializing these values is done by using heuristic methods according to empirical data and is well known by those skilled in the art.

Once the initial threshold values have been entered, an interlaced training video is inputted into the de-interlacing system 200 (step 1002). In one version, the training video can be a known progressive source that is converted into the interlaced video signal 100. Accordingly, the video output signal 400 generated by the de-interlacing system 200 corresponding to the interlaced training video can be directly compared to the progressive source pixel data to determine its accuracy. Moreover, the training video is preferably one that depicts a variety of motion and visual detail.

Next, the de-interlacing system 200 continues the training process by analyzing the pixel data 110 from the interlaced training video. In particular, for every missing target pixel 16 in an interlaced field, the motion detection unit 210 calculates and stores the bit values of motion data related to the missing target pixel 16 (step 1004). The bit values of motion data preferably include those corresponding to the per-field motion data 430 and those corresponding to the per-pixel motion data 440.

Simultaneously or subsequently, the video processing unit 220 generates and stores sample output values for each missing target pixel 16 using each of the plurality of per-pixel interpolation methods (step 1006). The sample output values for each missing target pixel 16 are compared to the correct values derived from the progressive source and an error measure is calculated for each sample output value (step 1008). Commonly used error measures such as squared error or absolute error are suited for this purpose and well known by those skilled in the art. Steps 1004 to 1008 should be repeated for all the missing target pixels of the interlaced training video.

Thus, for example, if the motion data comprises M bits for each missing pixel in each interlaced training field, then there are $_2M$ possible combinations of bit values of motion data such that: $\{MD(i)=i;$ where $0 \leq i \leq 2^M - 1\}$. Let there be K per-pixel interpolation methods that can be selected or mixed to generate the optimal de-interlacing method for each bit value of motion data. After the de-interlacing system completes analyzing the pixel data for all of the missing pixels in all interlaced training fields, for each bit value of motion data MD(i), there are C(i) occurrences throughout the interlaced training video, where $\Sigma_i$ C(i)=total number of missing pixels in all interlaced training fields. For each of the C(i) occurrences of MD(i), i.e., $1 \leq c \leq C(i)$, there are K stored sample output values $\{D(i, c, k); 1 \leq k \leq K\}$ for the missing target pixel 16 using each of the K per-pixel interpolation methods and K stored error measures, together with the corresponding correct value P(i, c) derived from the progressive source.

Based on the stored motion data and error measures, the optimal de-interlacing method is determined for each bit value of motion data as the one generating the sample output values with the least total error (TE) for all the missing pixels in all interlaced training fields that possess the same bit value of motion data (step 1010). Note that the optimal de-interlacing method can be one of the plurality of per-pixel interpolation methods or a combination of the plurality of per-pixel interpolation methods. A value identifying the optimal de-interlacing method is then entered into one of the at least one lookup tables 222 (step 1012).

In one version, the value ($LUT_1(i)$) in the look up table 222 corresponding to the bit value of motion data (MD(i)) is an index k of the per-pixel interpolation method generating the sample output values with the least total error (TE(i, k)) among all K per-pixel interpolation methods. That is:

$$LUT_1(i)=k$$

where $$TE_1(i, k) \leq TE_1(i, j) \text{ for all } 1 \leq j \leq K \text{ and } j \neq k, \text{ and}$$

$$TE_1(i, k) = \Sigma_c [D(c, c, k) - P(i, c)]^2.$$

In another version, the value ($LUT_2(i)$) in the look up table 222 corresponding to MD(i) is a set of mixing coefficients w that indicate the weight, if any, each of the plurality of per-pixel interpolation methods is given by the optimal de-interlacing method. The optimal mixing coefficients w produce the sample output values with the least total error ($LTE_2(i)$) among all possible sets of mixing coefficients. That is:

$$LUT_2(i) = w = [w_1 \; w_2 \; \ldots \; w_K]$$

where $$TE_2(i, w) \leq TE_2(i, w') \text{ for all } w' \neq w, \text{ and}$$

$$TE_2(i, w) = \Sigma_c \{[\Sigma_k D(i, c, k) \times w_k] - P(i, c)\}^2.$$

If K<<C(i) for each i, the optimal set of mixing coefficients w can be obtained by calculating analytically or numerically the least-square solution of an over-determined system of equations. Although squared error is used for the definition of the total error measure $TE_1$ and $TE_2$, other definitions of $TE_1$ and $TE_2$ are known in the art and are also applicable.

Once the values in the look up tables 222 have been entered, the training process continues by adjusting the per-pixel and per-field threshold values to achieve more uniformly distributed total errors for each bit value of motion data (step 1014). The goal for this threshold adjustment is to achieve equalized total errors (TE) for each bit value of motion data.

In one version, the threshold values are adjusted in the following manner. Suppose the bit value of motion data (MD(i)) comprises M bits for each missing pixel in each interlaced training field, and the M bits are combined from the results of the quantization of N per-pixel or per-field motion measurements, where each measurement contributes M(n) bits, 1<n<N, i.e., $M = \Sigma_n M(n)$. For each of the N per-pixel or per-field motion measurements (indexed by n), $2^{M(n)}-1$ thresholds (i.e., quantization levels) are needed to quantize its values into M(n) bits.

Suppose for each bit value of motion data MD(i), there is a known least total error LTE(i) after all the values in the at least one look up table 222 have been determined. The goal for the threshold adjustment performed in step 1014 is to achieve equalized least total errors LTE(i) for each bit value of motion data MD(i). Because the quantization of N per-pixel or per-field motion measurements is involved in generating the M bits in the motion data, this will be an N-dimensional optimization problem. The problem can be simplified by adjusting the thresholds for each of the N per-pixel or per-field motion measurements one at a time, resulting in N independent one-dimensional optimization problems. Hence, the equalized total error (BTE(b,n)) for each of the $2^{M(n)}$ bit values of the $n^{th}$ quantized per-pixel or per-field motion measurement can be calculated as:

$$BTE(b, n) = \Sigma_{be(i, n) = b} LTE(i)$$

where $0 \leq b \leq 2^{M(n)}-1$ and $1 \leq n \leq N$, and be(i, n) is the bit extraction function that extracts the M(n) bits of the $n^{th}$ quantized per-pixel or per-field motion measurement from the M bits of i.

The $2^{M(n)}-1$ thresholds for the $n^{th}$ quantized per-pixel or per-field motion measurement can then be adjusted to achieve equalized total errors BTE(b, n) for each of its bit values b. One possible method for adjusting the thresholds is to estimate, based on calculated BTE(b, n), the error distribution throughout all possible values of the $n^{th}$ quantized per-pixel or per-field motion measurement and then recalculate the $2^{M(n)}-1$ thresholds to equalize the estimated errors integrated between every two adjacent new thresholds according to the estimated error distribution. In general, after such a threshold adjusting process, the new thresholds will be more dense around values of b that have higher BTE(b, n) values and sparser around values of b that have lower BTE(b, n) values. Thus the goal of equalizing BTE(b, n) throughout all possible values of b can be achieved iteratively. Note that other methods for adjusting the thresholds are possible and that no particular method is critical to the practice of the present invention.

Referring again to FIG. 10, after the thresholds have been adjusted and the old values have been updated with the adjusted values (step 1014), it is determined whether to repeat the training process (step 1016). This determination can be based on one or more factors, such as whether the training process has been performed a predetermined number of times. It can also be determined by comparing the difference between updated threshold values and previous threshold values, and if the difference is less than a predetermined value, then the threshold values are optimized. Hence, the training process need not be repeated.

If the training process repeats, steps 1002 to 1016 are repeated. Otherwise, the training process terminates (step 1020). At this point, the optimal threshold values are set and the optimal values in the look up tables 222 are determined. The video processing unit 220 can then utilize the look up tables 222 to determine an optimal de-interlacing method 230 corresponding to a particular bit value for motion data related to a missing target pixel 16.

Figure 11:
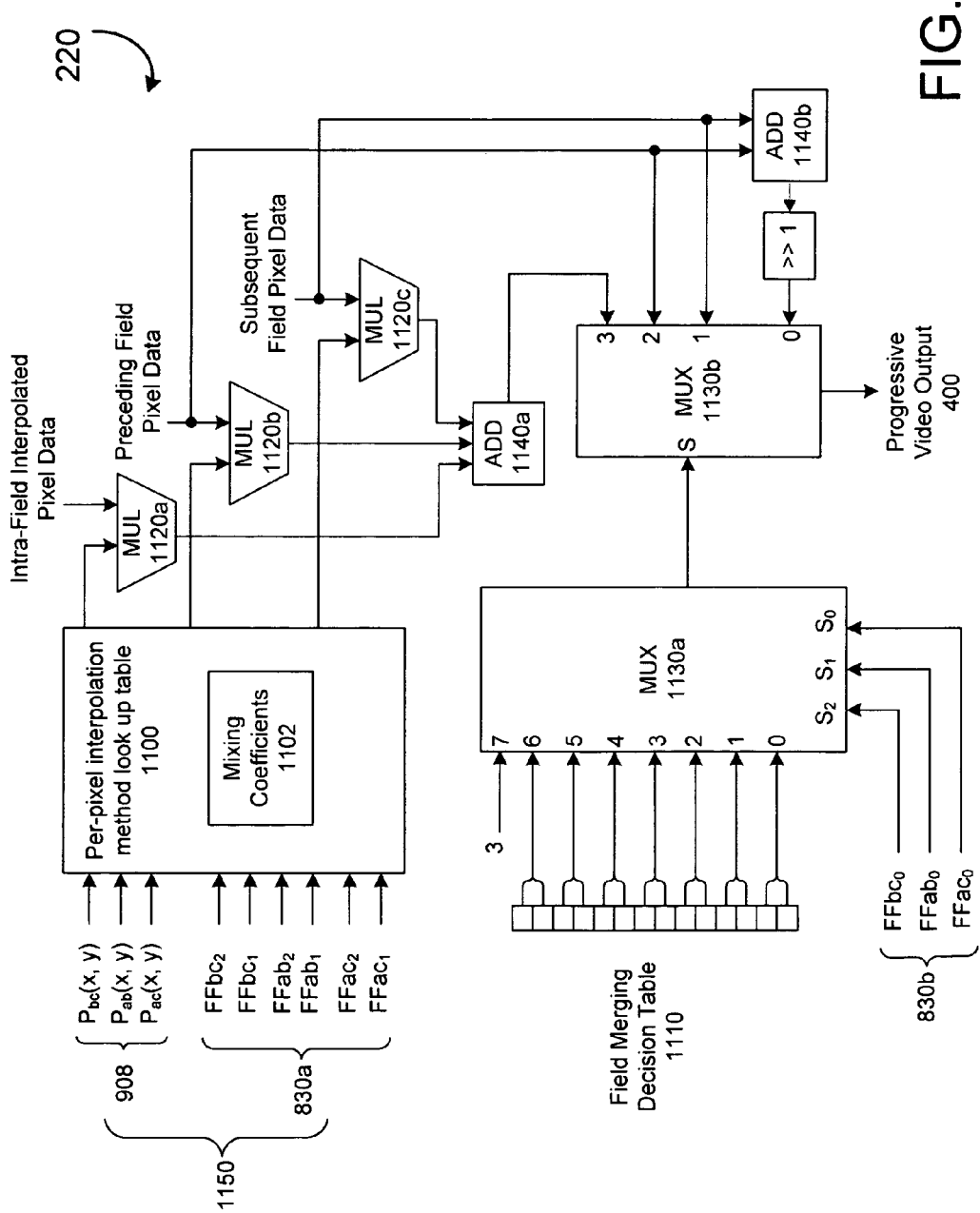
FIG. 11 is an exemplary block diagram of the video processing unit.

An exemplary block diagram of the video processing unit 220 is illustrated in FIG. 11. The video processing unit 220 utilizes a motion data bit pattern 1150 comprising the per-pixel motion data bits 908 and per-field motion data bits 830a derived from the higher per-field threshold levels (810b-810d) to perform a lookup on a per-pixel interpolation method lookup table 1100. Although the motion data bit pattern 1150 comprises nine (9) bits in FIG. 11, those skilled in the art readily recognize that the motion data bit pattern 1150 can include additional bits representing motion data for other pixels in different fields or in different spatial positions. Considering additional pixels generally provides a more reliable and accurate indication of motion characteristics around the missing target pixel 16 and therefore the interpolated value for the missing pixel 16 can be more accurate and precise. Nevertheless, adding more bits to the motion data bit pattern 1150 also increases the size of the lookup table 1100 and requires more memory and other resources. Hence, the number of bits in the motion data bit pattern 1150 can vary according to designer specifications.

Figure 12:
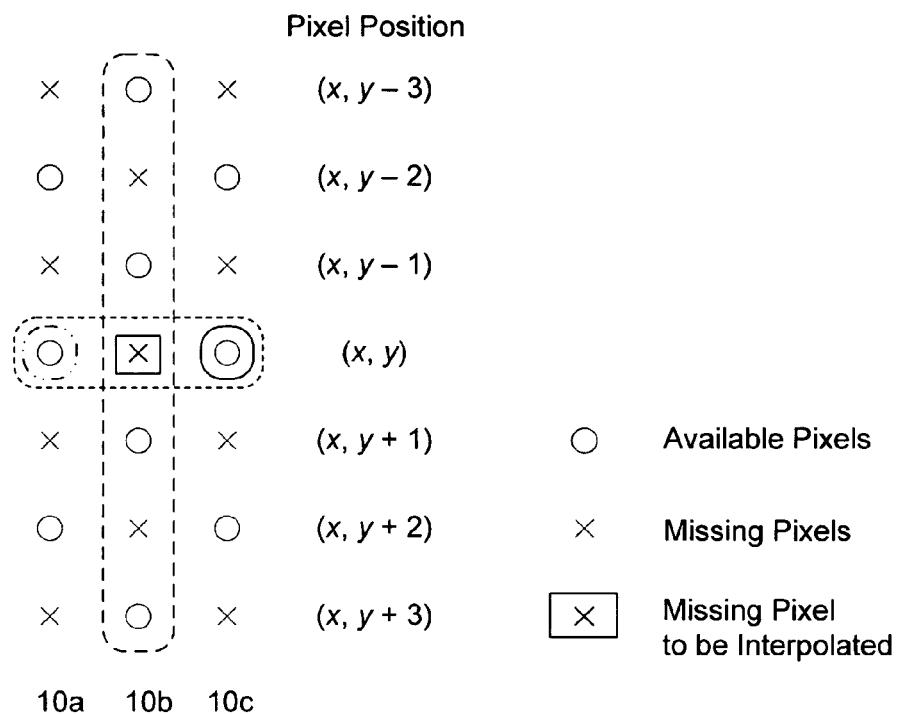
FIG. 12 illustrates four exemplary per-pixel interpolation methods utilized by the video processing unit.

In this exemplary case, four different per-pixel interpolation methods are available, which are illustrated in FIG. 12. A first method (method 0) utilizes the pixel data 110 from the two pixels 14 at the same spatial position as the missing target pixel 16 in the subsequent 10c and preceding 10a fields. The second and third methods (method 1 and method 2, respectively) utilize the pixel data 110 from the pixel 14 at the same spatial position in the subsequent field 10c and preceding field 10a, respectively. The fourth method (method 3) utilizes the pixel data 110 for four pixels 14 vertically adjacent to the missing target pixel 16 in the subject field 10*b*. Those skilled in the art readily recognize that other methods exist and that embodiments of the present invention are not limited to those illustrated here.

Referring again to FIG. 11, the video processing unit 220 can select one or a combination, i.e., mixture, of methods depending on the motion data bit pattern 1150. In one version, the per-pixel interpolation method lookup table 1100 includes a plurality of mixing coefficients 1102 that determine what weight can be given to each per-pixel interpolation method. The lookup table 1100 correlates the motion data bit pattern 1150 to a set of mixing coefficients 1102, where each mixing coefficient 1102 in the set corresponds to a per-pixel interpolation method.

Each mixing coefficient 1102 in the set is inputted to a multiplier 1120*a*-1120*c* where the pixel data associated with the per-pixel interpolation method and the mixing coefficient 1102 are multiplied. Depending on the mixing coefficients, a mixture or blend of two or more interpolation methods can be utilized, or only one method can be utilized. For example, if the mixing coefficient 1102 associated with the first method is 1.0, and the others in the set are zero (0), then only the first per-pixel interpolation method will be selected. If, however, the mixing coefficient 1102 associated with the first method is 0.25, that for the second method is 0.25 and that for the third method is 0.50 and that for the fourth method is zero (0), then the selected method will be a mixture of the first, second and third methods. The output of each multiplier 1120*a*-1120*c* is passed to an adder 1140*a* and the result is inputted into a progressive output multiplexer 1130*b* as one of several input signals (0-3).

The progressive output multiplexer 1130*b* also receives input signals (1, 2) associated with pixel data 110 from subsequent 10*c* and preceding 10*a* fields, respectively, as well as a signal (0) associated with an average of the pixel data 110 from subsequent 10*c* and preceding 10*a* fields. Note that the input signals associated with the pixel data 110 from subsequent 10*c* and preceding 10*a* fields can be used for field merging methods.

The video processing unit 220 also utilizes the per-field motion data bits 830*b* derived from the lower per-field threshold levels (810*a*) to determine whether a field-merging method is appropriate. A field merging decision table 1110 includes a plurality of field merging methods. A method selection multiplexer 1130*a* receives a plurality of input signals (0-6) associated with the methods in the field merging decision table 1110, an input signal (7) associated with the per-pixel interpolation method, and signals ($S_0$-$S_2$) associated with each of the lower threshold per-field motion data bits 830*b*, which ultimately determine which input signal (0-7) is selected and outputted. For example, if the per-field motion data bits 830*b* indicate that field merging is inappropriate, the method selection multiplexer 1130*a* will output the signal associated with the per-pixel interpolation method (input signal 7).

The output signal from the method selection multiplexer 1130*a* is received by the progressive output multiplexer 1130*b*. This signal, S, determines which of the input signals (0-3) to select. The value of the selected signal is the value for the missing target pixel 16 and outputted as the progressive video output 400.

Figure 13:
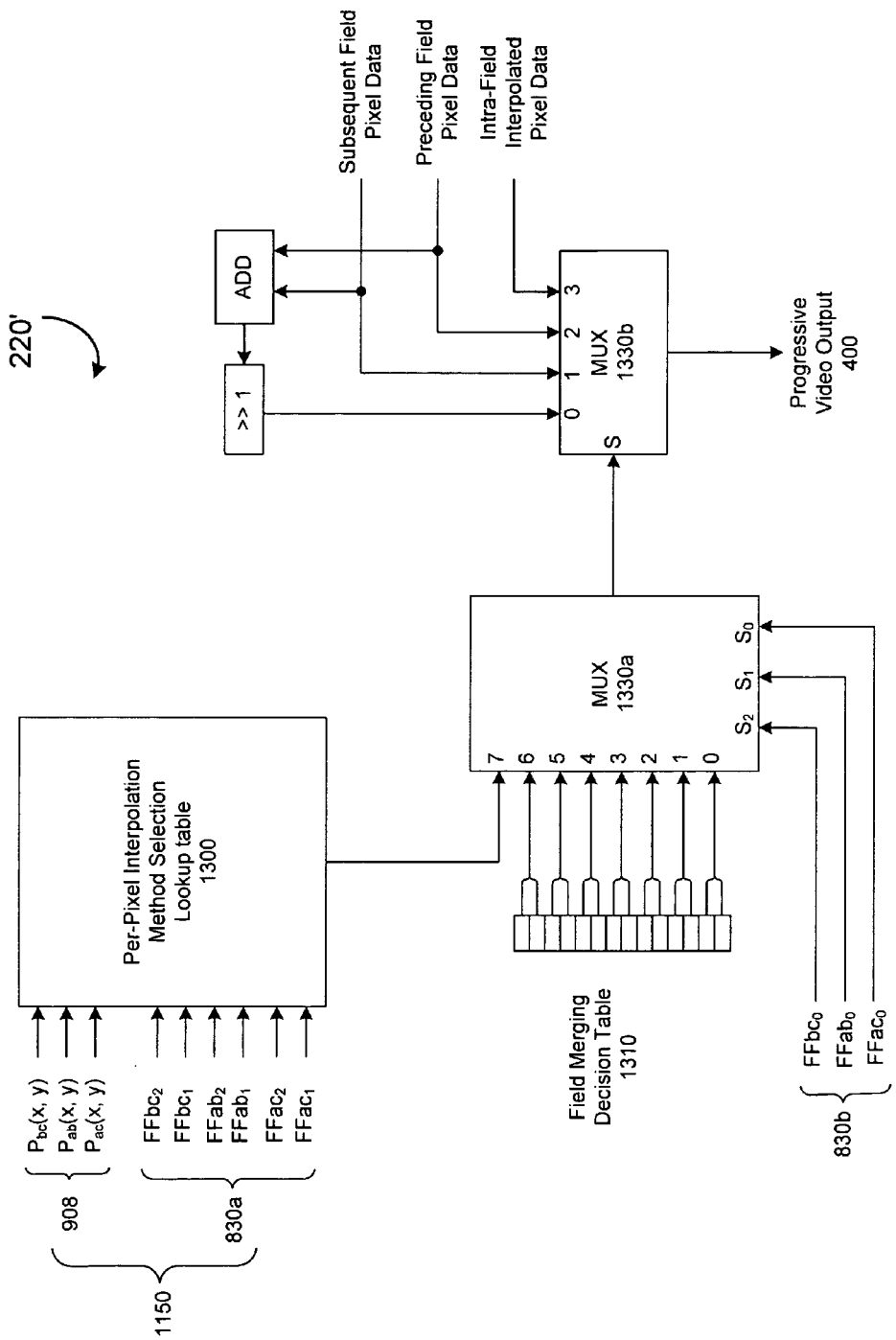
FIG. 13 depicts another version of an implementation of the video processing unit.

Another version of an implementation of the video processing unit 220' is illustrated in FIG. 13. In this version, the video processing unit 220' will select one per-pixel interpolation method that is optimal for calculating the value for the missing target pixel 16. The video processing unit 220' utilizes a motion data bit pattern 1150 comprising per-pixel motion data bits 908 and per-field motion data bits 830*a* derived from the higher per-field threshold levels (810*b*-810*d*) to perform a lookup on a per-pixel interpolation method selection lookup table 1300. In this version, the lookup table 1300 correlates the motion data bit pattern 1150 to one of the per-pixel interpolation methods that is inputted into a method selection multiplexer 1330*a* as an input signal (7).

Similar to the version depicted in FIG. 11, the video processing unit 220' utilizes the per-field motion data bits 830*b* derived from the lower per-field threshold levels (810*a*) to determine whether a field-merging method is appropriate. A field merging decision table 1310 includes a plurality of field merging methods. A method selection multiplexer 1330*a* receives a plurality of input signals (0-6) associated with the methods in the field merging decision table 1310, an input signal (7) associated with the per-pixel interpolation method selected according to the motion data bit pattern 1150, and signals ($S_0$-$S_2$) associated with each of the lower threshold per-field motion data bits 830*b*, which ultimately determine which input signal (0-7) is selected and outputted.

The output signal from the method selection multiplexer 1330*a* is received by the progressive output multiplexer 1330*b*. This signal, S, determines which of the input signals (0-3) to select. In this version, two input signals (1 and 2) are associated with pixel data 110 from subsequent 10*c* and preceding 10*a* fields, respectively, and one input signal (0) is associated with an average of the pixel data 110 from subsequent 10*c* and preceding 10*a* fields. Another input signal (3) is associated with intra-field interpolated pixel data 110. The value of the selected signal, based on the output signal from the method selection multiplexer 1330*a*, is the value for the missing target pixel 16 and outputted as the progressive video output 400.

As stated above, in this version, the video processing unit 220' is capable of selecting pure de-interlacing methods, i.e., ones that are not blended or mixed with another interpolation method. In certain circumstances, this may lead to less accurate interpolated values. Nevertheless, the configuration depicted in FIG. 13 offers advantages such as fewer computational resources and a smaller lookup table 1300.

According to versions of the present invention, the de-interlacing system 200 is capable of utilizing field merging methods if appropriate and/or switching or fading among several per-pixel interpolation methods. The de-interlacing system 200 selects at least one optimal de-interlacing method on a per-field and/or per-pixel basis based on per-field and/or per-pixel motion measurement data. The de-interlacing system 200 analyzes each interlaced video field and determines whether it should be merged with its previous and/or subsequent video field. If merging fields is inappropriate, e.g., because the per-field motion is above a certain threshold level, the de-interlacing system 200 will analyze each missing pixel in the field and determine whether to merge it with its neighboring pixels in the current, the previous, and/or the subsequent video fields.

Accordingly, the de-interlacing system 200 can properly handle: (1) an interlaced input video source generated by 2:2 pull-down, 3:2 pull-down, and any other progressive-to-interlaced conversion processes that split a progressive frame into two or more interlaced video fields; (2) improperly edited video sequences from 2:2, 3:2, or other pull-down film sources that result in stand-alone video fields; (3) abnormal even-even or odd-odd field sequences in the interlaced input video signal; and (4) overlap, cross-fading, and split-screen among video and/or film sources with different pull-down cadences.

The present invention has been described with reference to certain preferred versions. Nevertheless, other versions are possible. For example, the number of pixels and the locations of the pixels used to calculate motion data related to the missing target pixel can vary and other types of per-pixel interpolation methods can be utilized. In addition, more or fewer per-field threshold levels can be utilized. Further, alternative steps equivalent to those described for the de-interlacing and training processes can also be used in accordance with the parameters of the described implementation, as would be apparent to one of ordinary skill. Therefore, the spirit and scope of the appended claims should not be limited to the description of the preferred versions contained herein.

What is claimed is:

1. A method for determining a value for a missing target pixel in an interlaced video field during a de-interlacing process comprising:
   (a) providing at least one lookup table that correlates motion data to at least one of a plurality of de-interlacing methods;
   (b) generating motion data related to the missing target pixel;
   (c) utilizing the motion data related to the missing target pixel to perform a lookup on the at least one lookup table; and
   (d) selecting the at least one de-interlacing method correlated to the motion data to generate the value for the missing target pixel.

2. A method according to claim 1 wherein providing the at least one lookup table comprises:
   (i) performing a training process.

3. A method according to claim 2 wherein performing the training process includes:
   (1) producing a training video, wherein the training video includes a plurality of interlaced training fields derived from a known progressive video signal; and
   (2) for each missing target pixel in each of the plurality of interlaced training fields, utilizing at least one per-pixel threshold value and at least one per-field threshold value to generate motion data related to the missing target pixel.

4. A method according to claim 3 wherein performing the training process further includes:
   (3) for each missing target pixel, utilizing each of the plurality of de-interlacing methods to generate a plurality of sample values for the missing target pixel, wherein each sample value is associated with one of the plurality of de-interlacing methods;
   (4) comparing each sample value to the known progressive signal to determine an error measure between the sample value and the known progressive signal;
   (5) for each bit value of motion data, selecting one of the plurality of de-interlacing methods, wherein the selected de-interlacing method is that which generates the sample values having the least total error measure for all the missing target pixels in all interlaced training fields that possess the bit value of motion data; and
   (6) correlating the bit value of motion data with the selected de-interlacing method.

5. A method according to claim 4 wherein performing the training process further includes:
   (7) initializing the at least one per-pixel threshold value and the at least one per-field threshold value prior to generating motion data related to the missing target pixel;
   (8) adjusting the at least one per-pixel threshold value and the at least one per-field threshold value after correlating the motion data to the plurality of de-interlacing methods;
   (9) updating the threshold values with the adjusted threshold values;
   (10) determining whether to repeat the training process; and
   (11) if the training process is to be repeated, repeating steps (2) through (10).

6. A method according to claim 1 wherein the motion data represents relative motion temporally and spatially near the missing target pixel.

7. A method according to claim 1 wherein generating the motion data comprises:
   (i) analyzing pixel data associated with a plurality of pixels temporally and spatially proximate to the missing target pixel;
   (ii) calculating per-pixel motion measurements between the plurality of pixels; and
   (iii) quantizing the per-pixel motion measurements utilizing at least one per-pixel threshold value to form per-pixel motion data related to the missing target pixel.

8. A method according to claim 7 wherein the missing target pixel is in a subject interlaced field and the plurality of proximate pixels includes at least one pixel in the subject interlaced field, at least one pixel in at least one interlaced field temporally preceding the subject field and at least one pixel in at least one interlaced field temporally subsequent to the subject field.

9. A method according to claim 8 wherein generating the motion data further comprises:
   (iv) applying at least one per-pixel threshold to the per-pixel motion measurements;
   (v) accumulating the resultant per-pixel motion measurements to generate per-field motion measurements; and
   (vi) quantizing the per-field motion measurements utilizing at least one per-field threshold value to form per-field motion data related to the missing target pixel.

10. A method according to claim 9 wherein utilizing the motion data comprises:
    (i) utilizing the per-pixel motion data and a first portion of the per-field motion data to perform a lookup on a per-pixel interpolation lookup table, wherein the per-pixel interpolation lookup table correlates at least one per-pixel interpolation method to the per-pixel motion data and the first portion of the per-field motion data.

11. A method according to claim 10 further comprising:
    (e) utilizing a second portion of the per-field motion data to determine whether a field merging de-interlacing method can be used to generate the value for the missing target pixel;
    (f) if the field-merging de-interlacing method can be used, selecting the field-merging de-interlacing method to generate values for each missing target pixel in the subject field; and
    (g) if the field-merging de-interlacing method cannot be used, selecting the at least one per-pixel interpolation method correlated to the per-pixel motion data and the first portion of the per-field motion data.

12. A method according to claim 1 wherein the plurality of de-interlacing methods includes at least one weighted combination of at least two per-pixel interpolation methods.

13. A method according to claim 12 wherein providing the at least one lookup table includes:
    (i) correlating the motion data to a plurality of mixing coefficients; and (ii) associating each of the plurality of mixing coefficients with one per-pixel interpolation method thereby defining the weighted combination of per-pixel interpolation methods.

14. A method for converting a subject interlaced video field into a progressive video frame, wherein the interlaced video field comprises a plurality of available pixels and a plurality of missing pixels, comprising:
 (a) calculating motion data related to each of the missing pixels in the field, wherein the motion data represents motion between at least two available pixels and between at least two interlaced fields;
 (b) determining whether to merge the subject field with one of a previous field, subsequent field or a combination of the previous and subsequent fields based on the motion data between the at least two fields;
 (c) if it is determined not to merge fields, considering a first missing pixel in the field and selecting at least one of a plurality of per-pixel interpolation methods based on the motion data related to the missing pixel via at least one lookup table, wherein the lookup table correlates motion data to at least one of a plurality of de-interlacing methods during a training process; and
 (d) utilizing the selected at least one de-interlacing method to generate a value for the missing pixel.

15. A method according to claim 14 wherein at least one of the plurality of de-interlacing methods comprises a weighted combination of at least two per-pixel interpolation methods.

16. A method according to claim 14 further comprising:
 (e) if it is determined to merge fields, merging one of the previous field, subsequent field, or a combination of the previous field and the subsequent field with the field.

17. A method according to claim 14 further comprising:
 (e) performing a training process to generate the at least one lookup table comprising:
 (i) producing a training video, wherein the training video includes a plurality of interlaced training fields derived from a known progressive video signal;
 (ii) for each missing pixel in each of the plurality of interlaced training fields, utilizing at least one per-pixel threshold value and at least one per-field threshold value to generate motion data related to the missing pixel;
 (iii) for each missing pixel, utilizing each of the plurality of per-pixel interpolation methods to generate a plurality of sample values for the missing pixel, wherein each sample value is associated with one of the plurality of per-pixel interpolation methods;
 (iv) comparing each sample value to the known progressive signal to determine an error value between the sample value and the known progressive signal;
 (v) for each bit value of motion data, selecting one of or a weighted combination of the plurality of per-pixel interpolation methods, wherein the selected method or combination of methods is that which generates the sample values having the least total error value for all the missing pixels in all interlaced training fields that possess the said bit value of motion data; and
 (vi) correlating the bit value of motion data with the selected per-pixel interpolation method or a plurality of mixing coefficients corresponding to the selected weighted combination of per-pixel interpolation methods.

18. A method according to claim 17 wherein the training process further comprises:
 (vii) initializing the at least one per-pixel threshold value and the at least one per-field threshold value prior to generating motion data related to the missing pixel;
 (viii) adjusting the at least one per-pixel threshold value and the at least one per-field threshold value after correlating the motion data to the plurality of per-pixel interpolation methods;
 (ix) updating the threshold values with the adjusted threshold values;
 (x) determining whether to repeat the training process; and
 (xi) if the training process is to be repeated, repeating steps (ii) through (x).

19. A method for selecting a per-pixel interpolation process for determining a value for a missing target pixel in a subject interlaced video field comprising:
 (a) providing at least one lookup table that correlates motion data to at least one of a plurality of per-pixel interpolation processes;
 (b) calculating motion data related to the missing target pixel, wherein calculating the motion data comprises:
 (i) analyzing pixel data associated with a plurality of pixels temporally and spatially proximate to the missing target pixel, wherein the plurality of proximate pixels includes at least one pixel in the subject field, at least one pixel in at least one field preceding the subject field and at least one pixel in at least one field subsequent to the subject field;
 (ii) calculating per-pixel motion measurements between the plurality of pixels;
 (iii) utilizing the per-pixel motion measurements to calculate per-pixel motion data and per-field motion data;
 (c) utilizing the per-pixel motion data and a first portion of the per-field motion data to perform a lookup on the at least one lookup table, wherein the first portion of the per-field motion data indicates the presence of higher levels of per-field motion measurements; and
 (d) selecting the at least one per-pixel interpolation method correlated to the per-pixel motion data and the first portion of the per-field motion data.

20. A de-interlacing system comprising:
 (a) a motion detection unit for generating motion data related to a missing target pixel in a subject interlaced video field based on per-pixel motion measurements calculated from temporally and spatially proximate pixels in the subject field, at least one preceding field and at least one subsequent field;
 (b) a video processing unit for receiving the motion data, and for selecting and utilizing at least one of a plurality of de-interlacing methods to determine a value for the missing target pixel based on the motion data related to the missing target pixel; and
 (c) at least one lookup table accessible to the video processing unit for correlating motion data to at least one of the plurality of de-interlacing methods, whereby the video processing unit selects the at least one de-interlacing method by utilizing the motion data related to the missing target pixel to perform a lookup on the at least one lookup table.

21. A de-interlacing system according to claim 20 wherein the plurality of de-interlacing methods include a plurality of per-pixel interpolation methods and at least one weighted combination of at least two per-pixel interpolation methods.

22. A de-interlacing system according to claim 21 wherein the at least one lookup table correlates the motion data to a plurality of mixing coefficients corresponding to the plurality of per-pixel interpolation methods, wherein each mixing coefficient defines a weight associated with the corresponding per-pixel interpolation method.

23. A progressive scan display system comprising:
(a) a signal receiving unit;
(b) a tuner box for transforming the signal into an analog signal;
(c) a video decoder for transforming the analog signal into a plurality of interlaced video fields;
(d) a de-interlacing system for converting the interlaced video fields into a progressive video signal, the de-interlacing system comprising:
 (i) a motion detection unit for generating motion data related to a missing target pixel in a subject interlaced video field based on per-pixel motion measurements calculated from temporally and spatially proximate pixels in the subject field, in at least one preceding field and in at least one subsequent field;
 (ii) a video processing unit for receiving the motion data, and for selecting and utilizing at least one of a plurality of de-interlacing methods to determine a value for the missing target pixel based on the motion data related to the missing target pixel; and
 (iii) at least one lookup table accessible to the video processing unit for correlating motion data to at least one of the plurality of de-interlacing methods, whereby the video processing unit selects the at least one de-interlacing method by utilizing the motion data related to the missing target pixel to perform a lookup on the at least one lookup table; and
(e) a display for displaying the progressive video signal.

* * * * *